United States Patent [19]

Karmann

[11] Patent Number: 5,365,603
[45] Date of Patent: Nov. 15, 1994

[54] METHOD FOR ANALYZING MOVEMENTS IN TEMPORAL SEQUENCES OF DIGITAL IMAGES

[75] Inventor: Klaus-Peter Karmann, München, Germany

[73] Assignee: Siemens Aktiengesellschaft, Munich, Germany

[21] Appl. No.: 969,212

[22] Filed: Jan. 25, 1993

[30] Foreign Application Priority Data

Jul. 27, 1990 [DE] Germany .............................. 4023938

[51] Int. Cl.$^5$ .......................... G06K 9/20; G06K 9/46; G06K 9/66
[52] U.S. Cl. ......................................... 382/48; 382/17
[58] Field of Search ........................... 382/17, 48, 54; 358/133, 135, 136, 138; G06K 9/46, 9/66, 9/20, 9/40; H04N 7/12

[56] References Cited

U.S. PATENT DOCUMENTS

| | | |
|---|---|---|
| 4,745,633 | 5/1988 | Waksman et al. ..................... 382/42 |
| 5,034,986 | 7/1991 | Karmann et al. ..................... 382/41 |

OTHER PUBLICATIONS

"Time Recursive Motion Estimation Using Dynamical Models for Motion Prediction", by K. P. Karmann, IEEE 10th International Conference on Pattern Recognition, Atlantic City, vol. 1, Jun. 16, 1990, pp. 268–270.

"Underwater Navigation by Video Sequence Analysis", by F. Aguirre et al., IEEE 10th International Conference on Pattern Recognition, Atlantic city, vol. 2, Jun. 16, 1990, pp. 537–539.

"Direct Dynamic Motion Vision", by J. Heel, IEEE International Conference on Robotics and Automation, Cincinnati US, Proceedings, May 13, 1990, pp. 1142–1147.

"Moving Object Recognition and Classification in External Environments", by A. Mecocci, Signal Processing 18, (1989), Elsevier Science Publishers B.V., pp. 183–194.

"On the Computation of Motion from Sequences of Images–A Review", by J. K. Aggarwal, Proceeds of the IEEE, vol. 76, No. 8, Aug. 1988, pp. 917–935.

"A Differential Method for Simultaneous Estimation of Rotation, Change of Scale and Translation", by S. F. Wu et al., Signal Proceeding: Image Communication 2 (1990), Elsevier Science Publishers B.V., pp. 69–80.

"Determining Optical Flow", by B. K. P. Horn et al. Artificial Intelligence Laboratory, Cambridge, Mass. (1981) pp. 185–203.

(List continued on next page.)

Primary Examiner—Jose L. Couso
Attorney, Agent, or Firm—Hill, Steadman & Simpson

[57] ABSTRACT

Temporal sequences of predicted measurement data (Y), among which there are predicted movement data (W) relating to temporal sequences of digital images (I), are compared with temporal sequences of measured measurement data (S), among which there are measured movement data (V) relating to the same temporal sequences of digital images (I), by forming differences (D) from measured measurement data (S) and predicted measurement data (Y). These differences (D) are fed to a time-recursive filter (TRF) for estimating temporal sequences of state variables (X). The predicted measurement data (Y), including the predicted movement data (W) are determined from these state variables (X) with the aid of a measurement map (H). These predicted movement data (W) are used to determine (ME) measured movement data (V) relating to the temporal sequences of digital images (I). The method facilitates the determination of spatial structures and the analysis of spatial object movements, including intrinsic movement. Moving objects can be detected and segmented reliably.

20 Claims, 2 Drawing Sheets

OTHER PUBLICATIONS

"Moving Object Recognition Using an Adaptive Background Memory", by K. P. Karmann et al., Time-Varying Image Processing and Moving Object Recognition 2, (1990) Elsevier Science Publishers B.V., pp. 289–296.

"The Laplacian Pyramid as a Compact Image Code", by P. J. Burt et al., IEEE (1987), pp. 671–679.

"Three-Dimensional Computer Vision", by Yoshiaki Shirai, Siemens AG, 1987, pp. 85–89.

"Image Sequence Analysis for Object Tracking", by Johan Wiklund et al., Proceedings of the 5th Scand. Conf. on Image Analysis, Stockholm, Jun. 1987, pp. 641–648.

"Analyse und Interpretation von Bildfolgen" Part I, by Hans-Hellmut Nagel, Informatik-Spektrum (1985), Springer-Verlag, pp. 178–199.

"Analyse und Interpretation von Bildfolgen", Part II, by Hans-Hellmut Nagel, Informatik-Spektrum (1985), Springer-Verlag, pp. 312–327.

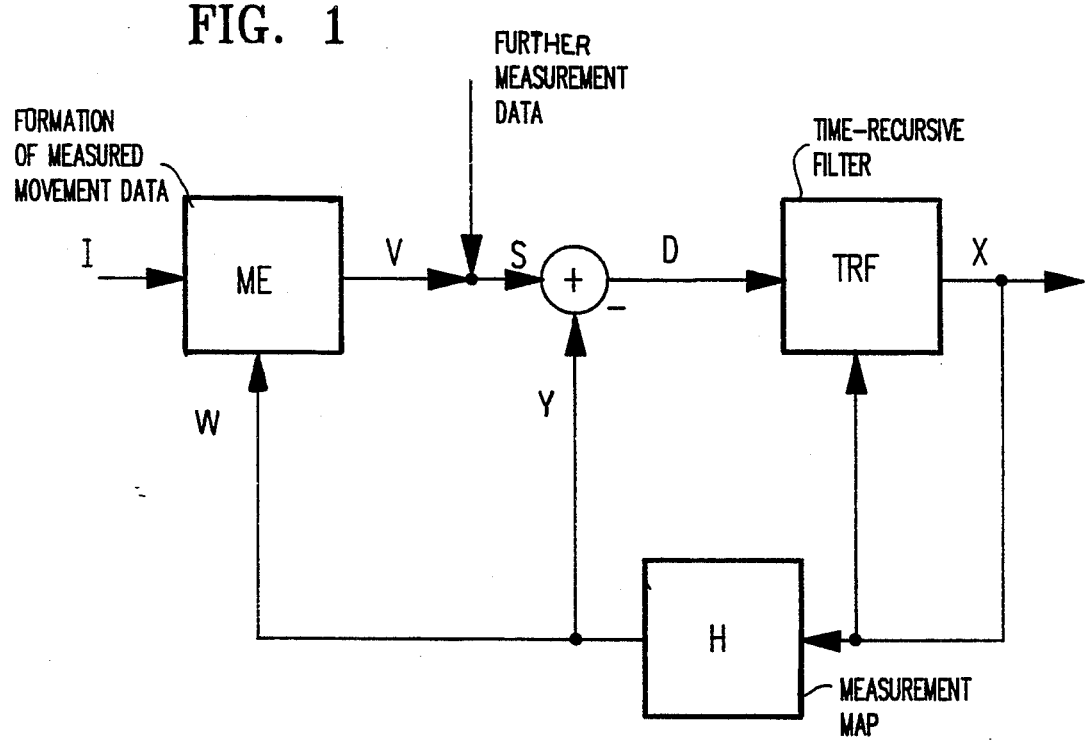
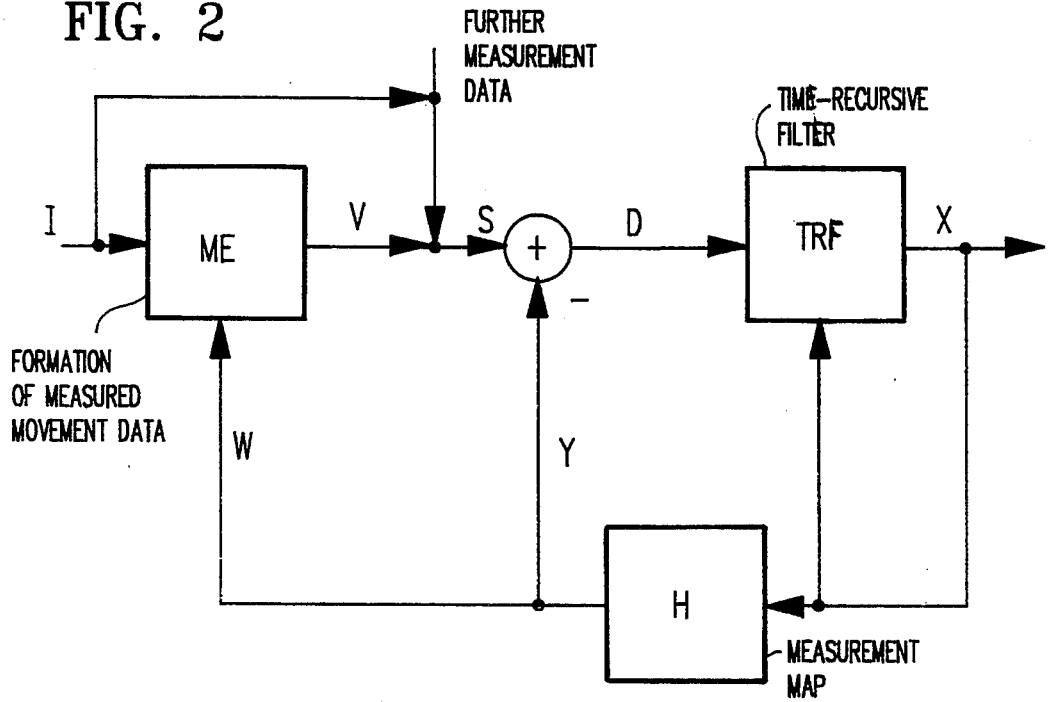

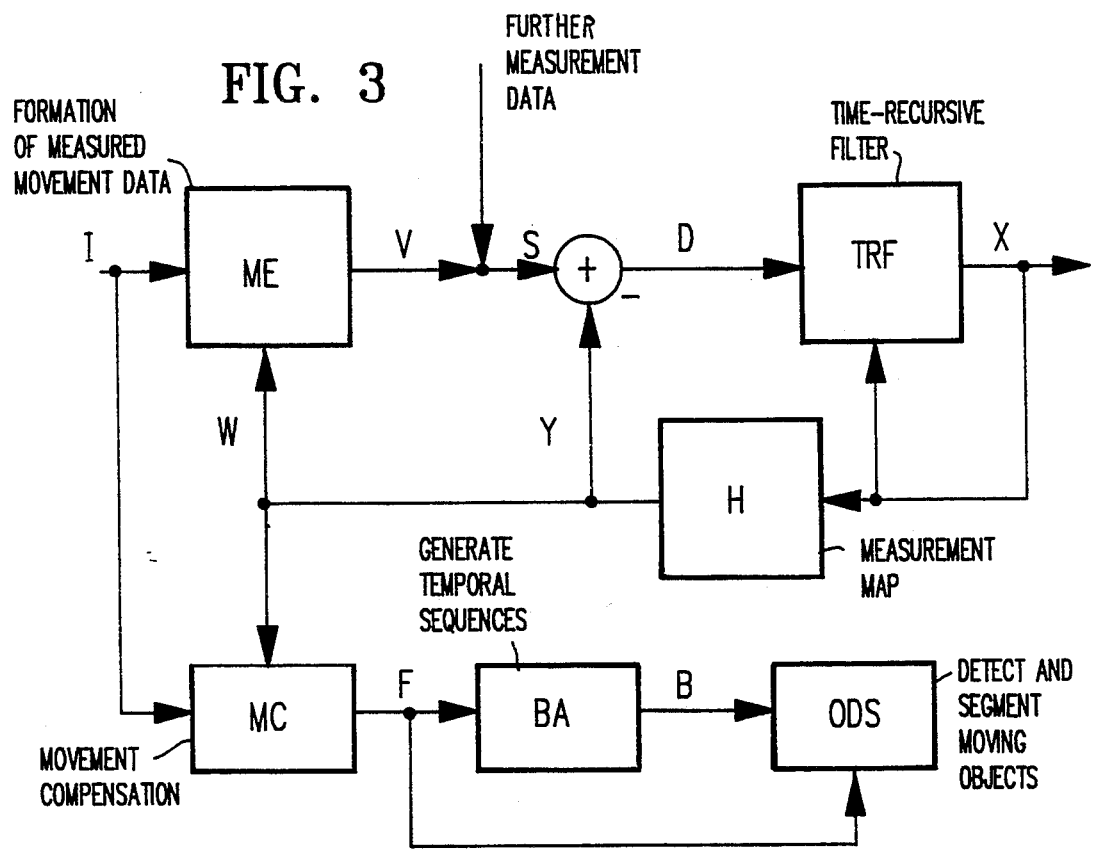
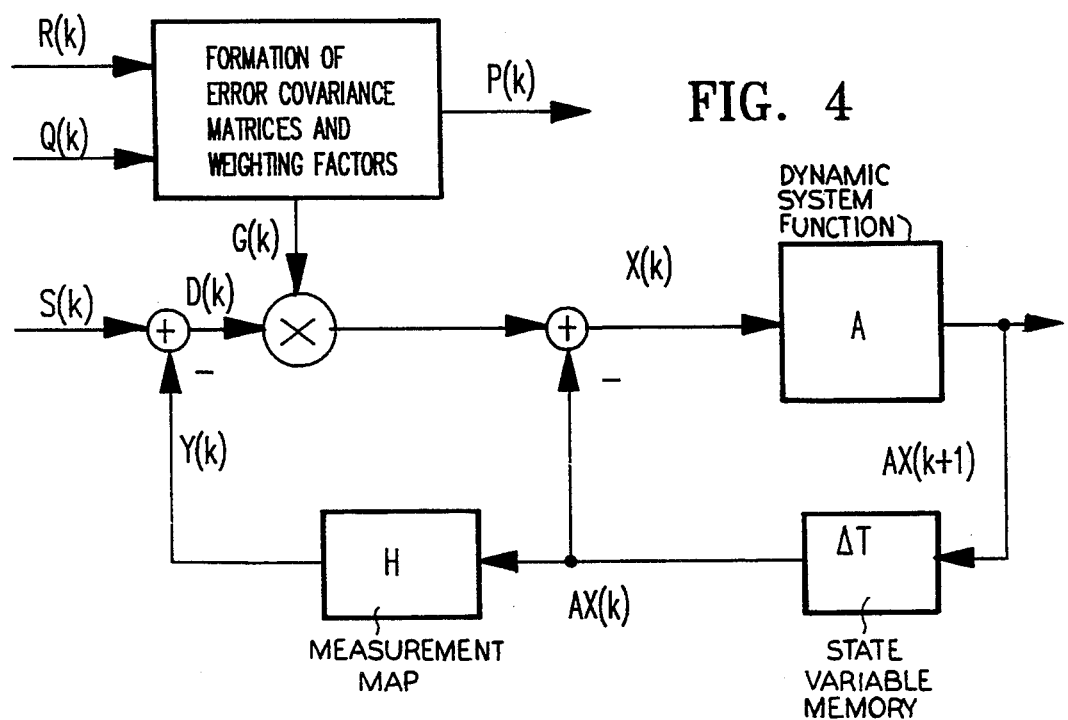

METHOD FOR ANALYZING MOVEMENTS IN TEMPORAL SEQUENCES OF DIGITAL IMAGES

BACKGROUND OF THE INVENTION

With the aid of methods for analyzing temporal sequences of digital images, the aim is to use one or more temporal sequences of digital images, possibly with the aid of measurement data of further sensors, such as tachometers or range finders, for example, to determine and analyze the movements of moving objects in space, the intrinsic movement of the imaging sensors (cameras) recording the images, and the spatial structure of the scenes visible in the image sequences.

Such methods are required in various technical fields, for example, in information technology, communication technology and automation technology, in order reliably to detect moving objects, determine their form, classify them with the aid of their movement, and mutually to coordinate the movement of a plurality of automatic systems. In this case, there is a requirement for as wide ranging an immunity as possible against external disturbances, and for a reliable distinction between changes in illumination and movements.

Examples of applications of such methods are found in video-based systems for monitoring and control functions, for example in production engineering or in road traffic control and instrumentation (intelligent traffic light control). The determination of spatial structures and the analysis of spatial movements is of the highest significance for applications in robotics, as well as for aims in autonomous navigation. For the purpose of supporting vehicle drivers, there is a need for systems which are capable, with the aid of one or more video cameras and of the vehicle speed determined by the tachometer, and with the aid of other data such as measured distance data, for example, of detecting moving objects in the environment of the vehicle, the spatial structure of the vehicle environment and the intrinsic movement of the vehicle in the environment, and of tracking the movement of detected objects. Finally, in communication technology the reduction of image data for purposes of transmission and storage of image data is steadily gaining in significance. Precisely in the case of coding temporal image sequences, analysis of movements delivers the key to a decisive reduction in datasets or data rates (movement compensation, model-based image coding).

Descriptions of different methods for analyzing temporal sequences of digital images are found in the specialist literature. The simplest type of method is represented by the so-called change detection (J. Wiklund, G. Granlund, "Image Sequence Analysis for Object Tracking", Proceedings of the 5th Scand. Conference on Image Analysis, Stockholm 1987), in which temporally successive images are compared. An improved change detection is described, for example, in A. Mecocci, Moving Object Recognition and Classification in Natural "Environments", Signal Processing 18 (1989), pages 183–194. It is based on the comparison of a temporal image sequence with a sequence of reference images which are calculated in a temporally recursive fashion and from which the moving objects are eliminated. The essential disadvantage of change detection is to be seen in that a stationary camera is presupposed.

Methods which are based on estimating displacement vectors or displacement vector fields in the image plane are of general applicability for analyzing movements. Such methods are, for example, described in H. H. Nagel, "Analyse und Interpretation von Bildfolgen", ("Analysis and Interpretation of Image Sequences") Informatikspektrum (1985) 8: pages 178 to 200 and pages 312 to 327, or in J. K. Aggarwal, N. Nandhakumar, "On the computation of Motion from Sequences of Images—A Review", Proceedings of the IEEE, Vol. 76, No. 8, 1988. In these types of method, displacement vectors of moving objects or of features such as edges or corners, for example, on moving objects are determined in the image plane.

Methods on the basis of two-dimensional displacement vectors or displacement vector fields are basically suitable for analyzing movements in digital image sequences. Their applicability is not subject to any sort of limiting assumptions concerning the movement of the camera or the movement and number of the moving objects visible in the image. However, with regard to analyzing the movements in three-dimensional space, these methods are to be regarded only as preprocessing or measurement methods, since the three-dimensional structure of the environment and the three-dimensional movement of objects cannot be directly gathered from two-dimensional displacement vectors.

SUMMARY OF THE INVENTION

It is the object of the invention to specify a method by means of which arbitrary, three-dimensional movements in temporal sequences of digital images can be analyzed. This object is achieved by means of a method for analyzing temporal sequences of digital images, in which temporal sequences of state variables are determined in a temporally recursive fashion by means of a comparison of temporal sequences of predicted measurement data, that includes predicted movement data, to temporal sequences of measured measurement data, that includes measured movement data. Developments of the invention follow from the subclaims.

The method according to the invention is also based on displacement vectors or displacement vector fields or similar movement data measured between two images belonging to different times. However, in contrast to the known methods, the method according to the invention uses the measured movement data as measurement data within a time-recursive estimate of state variables which are suitable for describing movements. These state variables are estimated with the aid of a comparison of the measured movement data with predicted movement data which, for their part, are determined from the state variables. A suitable choice of the state variables ensures that it is possible to calculate predicted movement data from the state variables alone, with the aid of current physical models of the kinematics of moving reference systems or imaging sensors.

It is possible by means of this mode of procedure to overcome difficulties and shortcomings of the known methods in determining three-dimensional structures and in estimating three-dimensional movement parameters from two-dimensional movement data. It is preferable to use time-recursive state estimators such as, for example, Kalman filters (F. R. Lewis, "Optimal Estimation", Wiley & Sons 1986) in order to estimate the state variables. As a result, the method according to the invention is rendered particularly robust against disturbances, changes in illumination or measurement errors.

The method facilitates the analysis of the intrinsic movement of imaging sensors in conjunction with simultaneous detection and segmenting of moving objects, including an analysis of the movement of the detected objects.

The concept of the invention can be implemented by a large number of method variants which, however, all have a uniform basic structure in common. In this case, which method variant is to be preferred depends on the special circumstances of an application under consideration. Accordingly, this uniform basic structure common to all method variants is described and explained below along with general assumptions of the method before the description of a preferred exemplary embodiment of the invention.

The method according to the invention assumes in each case that at least one temporal sequence of digital images from at least one camera is recorded or has been recorded. If a plurality of cameras, and thus a plurality of image sequences, are present, these cameras can move arbitrarily, including relatively to one another, in space. In addition to the image data, it is also possible for the method to process temporal sequences of further measurement data of other sensors, preferably tachometers or range finders. The reliability and robustness of the method increase in an entirely general fashion with the number of the sensors, to be precise when the individual sensors deliver independent information. Typical sensor configurations for the method according to the invention are (A) a camera connected to a tachometer,
(B) two cameras at a fixed relative distance and having a fixed orientation relative to one another, and
(C) a camera connected to a range finder.

However, other sensor configurations are also possible, in particular combinations of the three described.

The method can also be applied, if, apart from a single camera and thus a single temporal image sequence, no other sensors or other sensor data are available. In this case, all distances and sizes of spatial structures can be determined only relatively, that is to say up to a unit of measurement, and this, moreover, only if the camera is moved translationally. If the movement of the camera is known, for example, because it is controlled by the user, or if an object or a distance of a known size is visible in the images, conclusions can be drawn on the unit of measurement and on the absolute values of spatial dimensions.

The method assumes, furthermore, that displacement vectors or other movement data have been measured between images belonging to different times. The movement data can be, for example, the position and velocity vectors of moving objects or of prominent pixels, or also angles of rotation or the like (F. Wu, J. Kittler, "A Differential Method for Simultaneous Estimation of Rotation, Change of Scale and Translation", Signal Processing: Image Communication 2, 1990, pages 69 to 80). The most varied methods for measuring movement data, especially displacement vectors and displacement vector fields, are known from the literature (J. K. Aggarwal 1989). Virtually all these methods are based on optimizing a target function, or can be interpreted as methods for optimizing a target function (B. K. P. Horn, B. G. Schunk, Determining Optical Flow, Artificial Intelligence 17 (1981), pages 185–204 and B. Jähne, Digitale Bildverarbeitung, (Digital Image Processing), Springer 1989). Many of these methods are iterative, that is to say they determine improvements to prescribed approximations or initial solutions. The invention uses these characteristics of such methods for measuring movement data in a particularly advantageous way, by virtue of the fact that the method according to the invention uses the characteristics of the target function in the vicinity of the optimum as a measure for estimating the significance of the measured movement data to control the time-recursive estimation of the state variables, and determines from the estimated state variables predicted movement data which can be used as approximations or initial solutions to determine the measured movement data.

B. Jähne describes in B. Jähne (1987) different possibilities for forming from the characteristics of the target function at the optimum at a measure of the significance of the measured movement data, for example a covariance matrix. Such a measure can be used to control the time-recursive estimation of state, for example in the form of a measurement noise covariance matrix in the case of Kalman filters. For the case in which it is not dense displacement vector fields that are measured but individual displacement vectors at particularly prominent pixels (object edges, etc.), the measure of quality relating to the estimation of the significance of measurements in the pixels in which no measurement is available is assigned appropriately high values, which correspond to the prior knowledge, specific to the application, on the range of values of movement data to be expected or of possible movement data.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 shows a representation of the method for analyzing temporal sequences of digital images as a signal flow diagram.

FIG. 2 shows a signal flow diagram of a preferred exemplary embodiment of the method.

FIG. 3 shows a signal flow diagram of a preferred exemplary embodiment of the method.

FIG. 4 shows the signal flow diagram of a Kalman filter.

DESCRIPTION OF THE PREFERRED EMBODIMENT

The invention is explained further with the aid of a preferred exemplary embodiment.

FIG. 1 shows a representation of the method for analyzing temporal sequences of digital images as a signal flow diagram. Temporal sequences of predicted measurement data Y, among which there are predicted movement data W relating to temporal sequences of digital images I, are compared with temporal sequences of measured measurement data S, among which there are measured movement data V relating to the same temporal sequences of digital images I, by forming differences D from measured measurement data S and predicted measurement data Y. These differences D are fed to a time-recursive filter (TRF) for estimating temporal sequences of state variables X. The predicted measurement data Y, including the predicted movement data W, are determined from these state variables X with the aid of a measurement map H. These predicted movement data W are used to determine ME measured movement data V relating to the temporal sequences of digital images I.

FIG. 2 shows a signal flow diagram of the method for analyzing temporal sequences of digital images, in which the image signals of temporal digital images I are themselves used as measurement data.

FIG. 3 shows a signal flow diagram of the method for analyzing temporal sequences of digital images, in which the predicted movement data W are used for movement compensation MC of temporal sequences of digital images I. The movement-compensated image sequences F are used to generate (BA) temporal sequences of reference images B and to detect and segment moving objects (ODS), in which the movement-compensated images F are compared with the reference images B.

FIG. 4 shows the signal flow diagram of a Kalman filter for time-recursive estimation of temporal sequences of state variables X(k) composed of temporal sequences of measured measurement data S(k). The measured measurement data S(k) are compared for each instant k=1, 2 ... with predicted measurement data Y(k) by forming the differences D(k). The differences are multiplied by the weighting factors G(k), which in common with the prediction error covariance matrices P(k) result from the temporal dependence of the system noise covariance matrices Q(k) and the measurement noise covariance matrices R(k). The state variables X(k) are determined by addition from the weighted differences and the predicted state variables AX(k). The predicted state variables AX(k+1) of the following instant k+1 are generated from these state variables X(k) with the aid of the dynamic system function A and stored temporarily in the state variable memory ΔT.

A sensor configuration in which a moving camera records a temporal sequence I(k) of digital images and in which a tachometer measures the tracking speed u of the camera is adopted for the preferred exemplary embodiment. Displacement vectors V(k,p) on a prescribed raster of pixels p are measured with the aid of one of the known methods for determining two-dimensional displacement vector fields from temporal image sequences (J. K. Aggarwal, 1988).

In general, it is sensible and advantageous to assign each displacement vector V(k,p) relating to the time k in the pixel p a measure of quality which results from the behavior of the optimized target function at the optimum or in the vicinity of the optimum. The sharper the optimum, that is to say the more the values of the target function in the environment of the optimum differ from their value at the optimum V(k, p), the more significant the measurement V(k, p). Some target functions have the characteristic that their value at the optimum itself can be used to estimate the significance of the measurement.

It has proved to be advantageous to regard the inverse of the matrix of the second derivatives of the target function at the optimum as covariance matrix of the measurement. In the case of measurement of displacement vectors using the differential method (B. Jähne 1989), the measure of quality can then be selected to be proportional to the intensity gradient at the optimum or to a variable derived therefrom. In this case, the proportionality constant can, for example, depend on the value of the target function at the optimum.

Assuming that the imaging characteristics of the camera can be modelled to a sufficient approximation by the central projection, the relationship $$V_x(k,p) = \frac{\left(R(k,p) \times \frac{d}{dt} R(k,p)\right)_y}{(Z(k,p))^2} = \frac{\left(p \times \frac{d}{dt} R(k,p)\right)_y}{Z(k,p)} \quad (1)$$

and $$V_y(k,p) = \frac{\left(R(k,p) \times \frac{d}{dt} R(k,p)\right)_x}{(Z(k,p))^2} = \frac{\left(p \times \frac{d}{dt} R(k,p)\right)_x}{Z(k,p)} \quad (2)$$

between the measured displacement vectors V(k, p), the depth data Z(k, p) and the three-dimensional velocity vector (d/dt R(k, p)) is obtained.

In this case, $$P(P_x, P_y, 1) = \left(\frac{x}{z}, \frac{y}{z}, \frac{z}{z}\right) \quad (3)$$

and $$R(k,p) = (X(k,p), Y(k,p), Z(k,p)) \quad (4)$$

is the three-dimensional vector of the spatial point which is imaged at time k on the pixel p and whose coordinates are designated by X(k, p), Y(k, p) and Z(k, p) in a coordinate system whose axes are oriented in the direction of the coordinate axes of the image plane and in the direction of the optical axis of the camera. In accordance with the physical laws of kinematics (transformation of velocities between reference systems moving relative to one another), the three-dimensional velocity vector of this spatial point has the form $$\frac{d}{dt} R(k,p) = -t(k) + v(M(k,p)) - \omega(M(k,p)) \times \quad (5)$$

$$r(M(k,p)) + [\omega(M(k,p)) - \Omega(k)] \times R(k,p)$$

M(k, p) being the serial number of the moving object, which is visible at the point p of the image k, M=0 if the background is visible, t(K) being the velocity of the intrinsic reference system, Ω(K) being the rotational vector of the intrinsic reference system, r(M(k,p)) being the (centre-of-gravity) position vector of the moving object M(k, p), v(M(k,p)) being the (centre-of-gravity) movement vector of the moving object M (k, p) and ω(M(k, p)) being the rotation vector of the moving object M(k, p).

The focal length of the camera has been used in this case as unit of length.

Equations (1) and (2) are an example of a measurement map H in the sense of the theory of Kalman Filters (Lewis 86). The tracking speed u of the camera measured with the aid of the tachometer is a measured variable, possibly affected by noise, for the modulus of the velocity vector t(k) of the camera. Another measurement model can also be used in order to carry out the method. The selection of the preferred measurement model depends on the application and on the physical characteristics of the sensors. Equation (5) defines a dynamic model for the temporal development of the state variables $$(X)(k) = (t(k), \Omega(k), v(M(k)), \omega(M(k)), r(M(k)), Z(k)) \quad (6)$$

of the time-recursive estimation method. To be precise, discretization of the time derivative in equation (5) yields for the Z-component of this equation the difference equation $$Z(k + \Delta, p) = Z(k,p) - t_z(k) + V_2(M(k,p)) - [\omega(M(k,p))x + \quad (7)$$
$$r(M(k,p))]_z + [(\omega(M(k,p)) - \Omega(k)) \times p]_z \cdot Z(k,p)$$

If, in accordance with equation (6), it is assumed for the other components of the state vector that they vary only slowly (relative to the image rate or to the time step constant of the estimation method), equation (7) then delivers the non-trivial component of a dynamic system A for generating predicted state variables AX(k+1) from state variables X(k). If, in addition to the velocities and speeds of rotation of the camera and of the moving objects the aim is also further to estimate the position coordinates thereof, the state vector according to equation (6) is to be augmented by corresponding components.

The above equations define a Kalman filter for the time-recursive estimation of the state variables according to equation (6) (F. L. Lewis, 1986).

In the time-recursive estimation of the state variables X from the measured measurement data S, the measured measurement data S, among which the measured movement data V are to be found, are compared with predicted measurement data Y, among which predicted movement data W are to be found (FIG. 1). This is preferably performed by forming the differences D(k)=S(k)−Y(k) for each instant k. In this case, it is possible to regard the measured and predicted measurement data S(k) and Y(k), in which components having the same index correspond to one another in each case, as being combined to form vectors. The comparison therefore takes place component by component, giving rise to a difference vector D(k). If the components, corresponding to the movement data, of the measurement data vectors are measured or predicted displacement vectors V(k, p) and W(k, p), respectively, a component V(k) corresponding to each pixel p for which a displacement vector was measured or predicted, the components V(k, p) of the difference vector D(k) which correspond to the movement data are thus yielded as V(k,p)=V(k,p)−W(k,p).

The differences D(k) formed in this way are assigned to a time-recursive filter TAF (FIG. 1) with the aid of which the state variables X are calculated. This time-recursive filter is preferably a Kalman filter (F. L. Lewis, Optimal Estimation, Wiley, 1986) or a hierarchy of Kalman filters in which unknown filter coefficients of a hierarchical plane correspond in each case to the state variables of a higher-order hierarchical plane, and thus are estimated by means of this hierarchical plane.

In order to control a Kalmann filter, a temporal sequence of system noise covariance matrices Q(k) is required which characterizes the accuracy of the fundamental dynamic model. Such a sequence of system noise covariance matrices Q(k) can be formed from the differences D(k). For example, the squared differences or the temporal sequence of their dyadic products can be used as system noise covariance matrices Q(k) for controlling the time-recursive state estimation.

Apart from the system noise covariance matrices Q(k), measurement noise covariance matrices R(k) are also further required to control the Kalman filter. This purpose is served, for example, by the measure of quality, which was obtained in measuring the movement data, or a variable derived therefrom.

It is also possible to use other time-recursive filters instead of exact Kalman filters (FIG. 4). Kalman filters have the advantage that they can be derived directly from physically derivable or physically based models for the relationship between measurement data and state variables (models for the measurement process, measurement maps H) and from dynamic models A for the temporal development of the state variables (F. L. Lewis 1986). Virtually all time-recursive filters which can be used advantageously in this connection are Kalman filters (FIG. 4), or can be regarded as approximations of Kalman filters.

Various methods can be used to detect moving objects and to allocate serial object numbers M(k, p) to the pixels p which belong at time k to the moving object M(k, p). The path sketched in FIG. 3 can be selected for the case in which the camera movement is limited in an oscillatory fashion to a specific image section, so that the same scene is visible over long times in the image sequence. In this method, movement-compensated images F(k) are calculated (MC) with the aid of the predicted movement data W(k) and with the aid of the image sequence I(k). It is possible to apply to these movement-compensated images the known methods for detecting and segmenting moving objects (K. P. Karmann, A. v. Brandt, "Moving Object Recognition Using an Adaptive Background Memory", Proc. 3rd Intern. Workshop on Time-Varying Image Processing, Florence, Italy, May 29–31, 1989), which lead via the time-recursive calculation of a sequence of reference images B from the movement compensated images F and with the aid of a comparison of the movement-compensated images F with the reference images B directly to the attainment of binary object masks M(k,p).

In the general case of an arbitrarily moving camera, this method cannot, however, be applied. In this case, it is advantageous to introduce a higher dimensional state vector $$X(k) = (t(k), \Omega(k), V(k,p), r(k,p), \omega(k,p), Z(k,p)) \quad (8)$$

in which for each pixel p different object movement parameters v(k, p), r(k, p) and ω(k, p) are provided. In order for this state vector not to become of too high a dimension, it is advantageous to make use of a resolution pyramid (P. J. Burt, E. H. Adelson, "The Laplacian Pyramid as a compact Image Code", Readings in Computer Vision, M. A. Fischer, O. Firschein (eds.), Morgan Kaufmann Publishers, Los Altos, Calif., 1987). As a result, moving objects are firstly capable of being segmented only coarsely, corresponding to the selected resolution. In any case, different object movement parameters are firstly obtained for each pixel, or for each pixel in a plane of such a resolution pyramid. Moving objects, or segments of the image plane which belong to moving objects can be understood as coherent regions in the image plane in which the movement parameters satisfy a uniformity criterion. Thus, if the same numbers M(k, p) are allocated to pixels p inside coherent regions of uniform object movement parameters, the result is an object segmentation M(k, p) for arbitrary camera movements. This is advantageously performed with the aid of the "Region-Labelling" method described in (Y. Shirai, "Three-Dimensional Computer Vision", Springer Verlag 1987, pages 86 to 89).

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for analyzing temporal sequences of digital images, comprising the steps of:
   providing temporal sequences of digital images from at least one sensor;
   deriving measured movement data from the temporal sequences of digital images;
   deriving predicted movement data from the temporal sequences of digital images;
   providing temporal sequences of predicted measurement data and temporal sequences of measured measurement data;
   determining temporal sequences of state variables in a temporally recursive fashion using a comparison of the temporal sequences of predicted measurement data, that includes the predicted movement data, with the temporal sequences of measured measurement data, that includes the measured movement data;
   said temporal sequences of state variables being input to a measurement map, and said predicted movement data and said temporal sequences of predicted measurement data being output from said measurement map;
   said predicted movement data and said temporal sequences of digital images being input to a formation device, measured movement data and said temporal sequences of measured movement data being output from said formation device;
   said temporal sequences of measured movement data and said temporal sequences of predicted measurement data being into to a comparator, and temporal sequences of resultant measurement data being output from said comparator; and
   said temporal sequences of resultant measurement data and said temporal sequences of state variables being input to a time-recursive filter, and said temporal sequences being output from said time-recursive filter.

2. The method as claimed in claim 1, wherein the predicted and measured movement data are displacement vectors.

3. The method as claimed in claim 1, wherein the predicted measurement data is determined from the state variables.

4. The method as claimed in claim 1, wherein the comparison is performed by forming differences between the measured measurement data and the predicted measurement data.

5. The method according to claim 1, wherein the state variables are determined using at least one time-recursive filter.

6. The method as claimed in claim 5, wherein a measure of correspondence between the predicted measurement data and the measured measurement data is determined from the comparison.

7. The method as claimed in claim 6, wherein characteristics of the filter depend on the measure of the correspondence between the predicted measurement data and the measured measurement data.

8. The method as claimed in claim 1, wherein the measured movement data is determined taking account of the predicted movement data.

9. The method as claimed in claim 5, wherein in determining the measured measurement data, the significance of the measured measurement data is estimated using a measure of quality.

10. The method as claimed in claim 9, wherein characteristics of the filter depend on the significance of the measured measurement data, expressed by the measure of quality.

11. The method as claimed in claim 1, wherein the state variables are determined using at least one time-recursive filter, wherein a measure of correspondence between the predicted measurement data and the measured measurement data is determined from the comparison, wherein characteristics of the filter depend on the measure of the correspondence between predicted measurement data and the measured measurement data, wherein in determining the measured measurement data, the significance of the measured measurement data is estimated using a measure of quality, wherein characteristics of the filter depend on the significance of the measured measurement data, expressed by the measure of quality, and wherein the at least one time-recursive filter is a Kalman filter having system noise covariances given by the measure of the correspondence between the predicted measurement data and the measured measurement data, and having measurement noise covariances given by the measure of quality for estimating the significance of the measured measurement data.

12. The method as claimed in claim 1, wherein the state variables describe intrinsic movement of at least one imaging sensor.

13. The method as claimed in claim 1, wherein the state variables describe spatial structures relative to images of at least one imaging sensor.

14. The method as claimed in claim 1, wherein the state variables describe object movements in the temporal sequences of digital images.

15. The method as claimed in claim 1, wherein there are image signals of at least one temporal sequence of digital images among the measured measurement data, and wherein there are predicted values for said image signals among the predicted measurement data.

16. The method as claimed in claim 1, wherein at least one temporal sequence of movement-compensated images is determined using the predicted movement data.

17. The method as claimed in claim 16, wherein at least one temporal sequence of reference images is determined from the movement-compensated images.

18. The method as claimed in claim 17, wherein moving objects are detected and segmented by comparing the movement-compensated images with the reference images.

19. The method as claimed in claim 1, wherein a measure of correspondence between the predicted measurement data and the measured measurement data is determined from the comparison.

20. The method as claimed in claim 1, wherein in determining the measured measurement data, the significance of the measured measurement data is estimated using a measure of quality.

* * * * *